United States Patent [19]

Nitzsche et al.

[11] 3,862,919

[45] Jan. 28, 1975

[54] ORGANOPOLYSILOXANE COMPOSITIONS HAVING RESILIENT PROPERTIES

[75] Inventors: Siegfried Nitzsche; Paul Hittmair; Wolfgang Hechtl; Ernst Wohlfarth; Manfred Mittermeier, all of Burghausen, Germany

[73] Assignee: Wacker-Chemie GmbH, Munich, Germany

[22] Filed: Dec. 5, 1973

[21] Appl. No.: 421,892

[30] Foreign Application Priority Data

Dec. 6, 1972 Germany............................ 2259802

[52] U.S. Cl............. 260/18 S, 260/28, 260/33.4 SB, 260/37 SB, 260/46.5 R, 260/46.5 G, 260/46.5 E, 260/825

[51] Int. Cl. ............................................. C08f 19/14

[58] Field of Search......... 260/46.5 G, 46.5 E, 18 S, 260/825, 46.5 R

[56] References Cited

UNITED STATES PATENTS

| | | | |
|---|---|---|---|
| 3,186,963 | 6/1965 | Lewis et al.................. | 260/46.5 G |
| 3,772,240 | 11/1973 | Greenlee..................... | 260/18 S |

*Primary Examiner*—Melvyn I. Marquis

[57] ABSTRACT

The invention relates to a method for preparing compositions having a high degree of elasticity under suddenly applied stress by mixing a composition containing diorganopolysiloxanes in which a few siloxane units or silanes are present which have a functionality higher than the functionality of the diorganopolysiloxane units with a condensation catalyst obtained from the reaction of dialkyldialkoxysilanes and tin carboxylates.

11 Claims, No Drawings

ORGANOPOLYSILOXANE COMPOSITIONS HAVING RESILIENT PROPERTIES

The present invention relates to a method for the preparation of plastic, organopolysiloxane compositions exhibiting a high degree of elasticity under suddenly applied stress. More particularly, this invention relates to a method for preparing valuable putty-like materials by effecting a reaction between organopolysiloxanes and certain condensation catalysts.

To our knowledge, only boron siloxanes are endowed with the property of remaining plastic and thus fusible under constant deformation and recoil elasticity when exposed to impact stresses. Such substances are generally referred to as "bouncing putties," although some professionals refer to them as "rheopex masses." Compositions possessing a unique combination of properties including both a high degree of elasticity or "bounce" under suddenly applied stresses have been obtained by employing lewisite at an elevated temperature as a condensation catalyst as well as reacting diorganopolysiloxanes having small amounts of methylsiloxane units, i.e. siloxane units with a higher functionality than diorganopolysiloxane units with a compound of boron, preferably followed by a further treatment of the product with heat.

Heretofore, the bouncing putty compositions containing boron had to be prepared and shipped to the site to be used. In addition these compounds were not resistant to hydrolysis. Also it was not possible to seal hollow spaces easily and in a short period of time with these bouncing putties because of their high viscosity. Furthermore, the properties of these bouncing putties change when exposed to humid air for long periods of time.

It is therefore an object of this invention to provide a method for preparing plastic, organopolysiloxane compositions which exhibit a high degree of elasticity under suddenly applied stress. Another object of this invention is to provide compositions which are free of boron and exhibit a high degree of elasticity under suddenly applied stress. Another object of this invention is to provide compositions which can be prepared at the site where they are to be used. Still another object of this invention is to provide compositions which are resistant to hydrolysis. A further object of this invention is to provide compositions which have a low enough viscosity that they can be used to seal hollow spaces. A still further object of this invention is to provide compositions which retain their physical properties even when exposed to humid air for long periods of time.

The foregoing objects and others which will become apparent from the following description are accomplished in accordance with this invention, generally speaking, by incorporating a condensation catalyst obtained from the reaction of dialkyldialkoxysilanes and tin carboxylates in a composition containing diorganopolysiloxanes in which a few siloxane units or silanes are present which have a functionality higher than the functionality of the diorganopolysiloxane units.

The organopolysiloxanes employed in this invention are free of boron and contain primarily silicon, carbon, oxygen and hydrogen atoms except for various substituents which are bonded to the silicon atoms by carbon. In addition, the diorganopolysiloxanes also contain condensable groups, which are generally present in the terminal units. Because of their availability, Si-bonded hydroxyl groups are the preferred condensable groups. Further examples of condensable groups are alkoxy groups having from 1 to 10 carbon atoms, such as methoxy groups, ethoxy groups, propoxy groups, butoxy groups and decoxy groups, and alkoxyalkoxy groups such as methoxyethoxy groups ($CH_3OCH_2CH_2-$). Other condensable groups which may be present are acyloxy groups having from 1 to 18 carbon atoms in the acyl group. Suitable examples of acyloxy groups are acetoxy, propionyloxy, valeryloxy, caproyloxy, myristoyloxy and stearoyloxy groups.

Among the siloxane units having a functionality higher than those of the diorganosiloxane units are $RSiO_{3/2}-$ and $SiO_{4/2}-$ units, where R represents a monovalent, or a substituted monovalent hydrocarbon radical. These units can however be entirely or partially substituted by

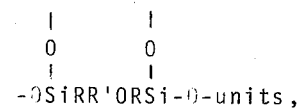

where R has the same meaning as above and R' represents a divalent hydrocarbon radical such as for example an alkylene radical, i.e., ethylene, trimethylene, tetramethylene, hexamethylene, octamethylene or an arylene radical such as phenylene.

In addition to the siloxane units having a functionality above that of the diorganosiloxane units, the diorganopolysiloxanes may also contain monofunctional organosiloxane units, especially those corresponding to the general formula $R_3SiO_{1/2}$, where R has the same meaning as above. It should be noted that each unit of the $R_3SiO_{1/2}$ formula always compensates for an $RSiO_{3/2}$ unit or half an $SiO_{4/2}$ unit.

Although the amount of siloxane units or silanes having a functionality higher than that of the diorganosiloxane units is not critical, at least one siloxane unit or silane molecule having a functionality higher than that of the diorganosiloxane unit, i.e., a functionality of 2, which is not compensated for by a monofunctional organosiloxane unit ($R_3SiO_{1/2}$) should be present for each 100 to 1,000 diorganosiloxane units. Thus for each uncompensated $RSiO_{3/2}$ unit there are 100 to 1,000 diorganosiloxane units and for each uncompensated $SiO_{4/2}$ unit there are from 200 to 2,000 diorganosiloxane units. Where the amount of siloxane units or silanes having a functionality higher than that of the diorganosiloxane units, is less than each functionality in each of these siloxane units or each silane molecule, whose functionality exceeds 2, for each 1,000 diorganosiloxane units, the resulting compositions will have a very low degree of elasticity when exposed to impact stresses.

If the amount of siloxane units or silanes having a functionality higher than the functionality of the diorganosiloxane units is greater than the functionality in each of these siloxane units or in each silane molecule whose functionality exceeds 2 for each 100 diorganosiloxane units, then the compounds will not exhibit sufficient plastic properties when exposed to repeated deformation.

The siloxane units which are other than diorganosiloxane units can be present as copolymers with the diorganopolysiloxanes and/or in admixture with the diorganopolysiloxanes.

If the diorganopolysiloxanes contain other siloxane units as a mixture only, in other words when the -diorganopolysiloxanes- themselves consist only of diorganosiloxane units, then they can for example be illustrated by the general formula $$XSiR_2O(SiR_2O)_mSiR_2X$$

where R has the same meaning as above, X represents a condensable group and $m$ has a value of at least 5.

Examples of suitable organic radicals represented by R are SiC-bonded hydrocarbon radicals having from 1 to 18 carbon atoms, such as alkyl radicals, e.g., methyl radicals, ethyl radicals, propyl radicals, butyl radicals, hexyl radicals and octadecyl radicals; alkenyl radicals, such as, for example vinyl radicals, allyl radicals, ethylallyl radicals and butadienyl radicals; aryl radicals, such as, for example the phenyl radicals; alkaryl radicals, such as, for example the tolyl radicals and aralkyl radicals, such as, for example the beta-phenyl radical; as well as substituted hydrocarbon radicals, such as halogenated hydrocarbon radicals, e.g., 3,3,3-trifluoropropyl radicals, chlorophenyl radicals, bromotolyl radicals and cyanoalkyl radicals, such as the beta-cyanoethyl radical.

Because of their availability, it is preferred that at least 50 percent of the R radicals consist of methyl radicals and the remainder of the radicals represented by R are especially phenyl and/or vinyl radicals.

Examples of diorganopolysiloxanes which contain only small amounts of siloxane units or silanes having a functionality greater than the diorganosiloxane units, are:

1. Mixtures of diorganopolysiloxanes which have in each of their terminal units an Si-bonded hydroxyl group and at least three condensable groups per molecule, which consist of $RSiO_{3/2}$-units and/or silanes of the general formula $R_aSiX'_{4-a}$ where R has the same meaning as above, X' represents a hydrolyzable group and a is either 0 or 1; and where each $RSiO_{3/2}$-unit or each silane molecule of the general formula $RSiX_3'$ has 100 to 1,000 diorganosiloxane units.

2. Mixtures of diorganopolysiloxanes having in each of their terminal units an Si-bonded hydroxyl group and organopolysiloxanes of $RSiO_{3/2}$- and $R_2SiO$-units with at least three condensable groups per molecule, where R has the same meaning as above and each $RSiO_{3/2}$-unit has from 100 to 1,000 diorganosiloxane units.

3. Organopolysiloxanes having $R_2SiO$-and $RSiO_{3/2}$-units in which at least three condensable groups are present per molecule, where R has the same meaning as indicated above and each $RSiO_{3/2}$-unit has 100 to 1,000 diorganosiloxane units.

4. Organopolysiloxanes of the type described under paragraphs (1) to (3) above, with the change that the $RSiO_{3/2}$-units are partially or entirely substituted with $SiO_{4/2}$-units including $SiO_{4/2}$-units in the form of "ethyl-silicate 40" with 100 to 1,000 diorganosiloxane units being present for each $RSiO_{3/2}$-unit and from 200 to 2,000 diorganosiloxane units being present for each $SiO_{4/2}$-unit.

5. Organopolysiloxanes of the type described in paragraph (4) except that $R_3SiO_{1/2}$-units are also present, where R has the same meaning as above, with 100 to 1,000 diorganosiloxane units being present for each uncompensated $RSiO_{3/2}$-unit and from 200 to 2,000 diorganosiloxane units being present for each uncompensated $SiO_{4/2}$-unit.

Examples of silanes corresponding to the general formula $R_aSiX'_{4-a}$ are alkyltrialkoxysilanes such as methyltrimethoxysilane, methyltriethylsilane, methyltripropoxysilane, methyltributoxysilane, ethyltrimethoxysilane, ethyltributoxysilane, propyltriethoxysilane, propyltributoxysilane, butyltrimethoxysilane, butyltriethoxysilane butyltributoxysilane and tetraalkoxysilanes, such as tetraethoxysilane, tetrabutoxysilane and the like.

Organopolysiloxanes described above can be produced by conventional means, for example through the hydrolysis or co-hydrolysis of silanes corresponding to the general formula $R_nSiZ_{4-n}$, where R has the same meaning as above, Z represents a hydrolyzable group and/or a hydrolyzable atom and $n$ is 0, 1, 2 or 3. Examples of the hydrolyzable groups represented by Z and X' are amine, oxime, alkoxy, acyloxy and acylamine groups. Examples of hydrolyzable atoms are halide atoms, especially chlorine atoms.

In order that the process of this invention may be carried out at the site at which these plastic organopolysiloxane compositions are to be used it is preferred that the diorganopolysiloxanes which contain only a small amount of siloxane units or silanes having a functionality higher than that of the diorganosiloxane units, have a viscosity of no more than about 100,000 cP at 25°C., and more preferably a viscosity of no more than 20,000 cP at 25°C. The lower viscosity limit is of course not critical. It should however, not be below 50 cP at 25°C. and preferably not below 100 cP at 25°C. This is desirable in order to assure a satisfactory dispersion of the fillers which are generally employed in the compounds prepared in accordance with this invention.

The dialkyldialkoxysilanes from which the condensation catalysts are prepared through the reaction of these silanes with carboxylic acid tin compounds are preferably those which correspond to the general formula.

$$R_2Si(OR')_2$$

where R has the same meaning as indicated above and R' is an alkyl radical which may be interrupted by an ether oxygen atom, having from 1 to 18 carbon atoms and more preferably from 1 to 7 carbon atoms.

Examples of R' radicals are alkyl radicals such as methyl, ethyl, propyl, butyl and hexyl radicals and a radical of the formula $CH_3OCH_2CH_2$.

Mixtures of various dialkyldialkoxysilanes can also be employed.

Among the carboxylic acid tin compounds which may be employed are the dialkyl tin salts of carboxylic acids. These are preferred because of their good miscibility with organopolysiloxanes. Examples of dialkyl tin salts of carboxylic acids are dibutyl tin salts of carboxylic acids, which are branched towards the carboxyl group in the alpha position and which have from 9 to 11 or more carbon atoms for each acid molecule, which are on the market under the name "dibutyltindiversatate". Examples of suitable tin carboxylates are dibutyltindilaurate, dibutylindiacetate, di-2-ethylhexyl-tinmaleinate, bis-(dimethyl-oleyl)-distannoxane, bis-(dibutyllauroyl)-distannoxane and the like.

Other examples of tin carboxylates are tributyltin-monoleate and tin-2-ethylhexoate.

Mixtures of various tin carboxylates may also be used.

The tin carboxylates, including the dialkyltin salts of carboxylic acids and the dialkyldialkoxysilanes are preferably employed in amounts of 2 gram-atoms of tin for each mole of dialkyldialkoxysilane to 1 gram-atom of tin for each 3 moles of dialkyldialkoxysilane, and preferably in amounts of 1 gram-atom of tin in the tin salt for each 2 moles of dialkyldialkoxysilane.

The reaction of the alkoxysilanes with the tin carboxylates can be carried out at temperatures of from 50 to 200°C. such as described in U.S. Pat. No. 3,186,963 to Lewis et al.

The reaction is preferably carried out at ambient pressure, i.e., at 760 mm Hg (abs.) or at approximately 760 mm Hg (abs.). Higher or lower pressures may however be employed, if desired. The reaction time may range from 30 minutes up to 30 hours.

The carboxylic acid ester by-product which is generated during the reaction of the dialkyldialkoxysilane with tin carboxylates can be removed from the reaction product by means of distillation, prior to the use of the reaction product. If desired, the carboxylic acid ester by-product need not be removed in order to provide a suitable catalyst for the condensation reaction.

Generally the reaction products of the dialkyldialkoxysilane and the tin carboxylates are used in amounts of from 0.1 to 15 percent by weight, and preferably from 0.5 to 10 percent by weight based on the weight of the diorganopolysiloxanes which contain small amounts of siloxane units or silanes having a greater functionality than those of the diorganosiloxane units.

The process of this invention is preferably carried out at ambient temperature, i.e. between 0°C. and 25°C., as well as at ambient pressure. However, lower or higher temperatures and/or pressures may be employed if desired. Higher temperatures do of course accelerate the transformation of the mixture consisting of diorganopolysiloxanes having only small amounts of siloxane units or silanes with a functionality higher than those of the diorganosiloxane units and the condensation catalyst which is the reaction product of dialkyldialkoxysilanes and tin carboxylates into a plastic composition having a high degree of elasticity and bounce.

In addition to the diorganopolysiloxanes which contain only small amounts of siloxane units or silanes having a greater functionality than those of the diorganosiloxane units and the reaction products of dialkyldialkoxysilanes and tin carboxylates, it is of course possible to employ suitable additives for preparing bouncing putties or organopolysiloxane elastomers. Examples of such additives are fillers, pigments such as ferrous oxide, soluble colors, softeners such as long chained carboxylic acids, such as oleic acid and mixtures of carboxylic acids having from 9 to 11 carbon atoms per molecule which are branched towards the carboxyl group in the alpha position; and especially diorganopolysiloxanes which are terminally blocked by triorganosiloxy groups; lubricants such as ferrous stearate, parrafins, aromatics and polyglycols which can be etherated and/or esterified; and water in order to accelerate the action of the condensation catalyst.

Examples of fillers which may be employed are inorganic fillers such as pyrogenic silicon dioxide produced in the gaseous phase, titanium dioxide, barium sulfate, quartz powder, calcium carbonate, diatomaceous earth aluminum silicate as well as organic fillers such as polyvinylchloride powder. Hydrophobic properties can be imparted to the inorganic fillers by treating these fillers with water repellent agents, such as calcium stearate or trimethylhalosilanes, such as described in U.S. Pat. No. 2,610,167 to Te Grotenhuis.

This invention requires the presence of water. The amount of water absorbed in the commercially available fillers as well as the moisture present in the atmosphere are generally adequate. If however, the mixture which contains the organopolysiloxanes, fillers and other additives is totally devoid of water, it can be stored in tubes and be merchandised as so called "single component systems," in which case, the plastic organopolysiloxane compositions having a high degree of elasticity are produced only when water, i.e. ambient air is added. This means, of course, that if water is not excluded or even added during the preparation of the compounds prepared from the substances employed in the invented process, the so called "two component systems" will exist, which shall result in the formation of a plastic composition having a high degree of elasticity and bounce immediately during or shortly after mixing of the components. It is therefore necessary that the condensation catalysts employed in accordance with this invention be stored separately from the other materials of this composition unless the latter are entirely devoid of water.

The process which is the subject of this invention and the resulting compositions can be employed in all fields where the use of bouncing putties or plastic compositions having a high degree of resiliency are desired. For example, these compositions may be employed in cable ends, as impact absorbents for moving parts, such as couplings, door closing devices and recoil dampeners, as permanent plastic sealants for motors, screw sealants, children's toys, record players and physical therapy devices.

In the preparation of the condensation catalysts employed in accordanced with this invention and in the following examples all parts and percentages are by weight unless otherwise specified.

The condensation catalysts which are employed in this invention are prepared in the following manner:

A. A mixture containing 350 parts of dibutyltindiacetate and 296 parts of dimethyldiethoxysilane is heated to reflux temperature and refluxed for 3 hours in an oil bath heated to 150°C. About 160 parts of ethyl acetate formed during the reaction are then distilled through a fractioning column. The resulting almost colorless liquid is used as the condensation catalyst.

B. A mixture containing 640 parts of dibutyltindilaurate and 296 parts of dimethyldiethoxysilane is heated to reflux temperature and refluxed for 24 hours in an oil bath heated to 150°C. The almost colorless liquid thus obtained is used as the condensation catalyst without removing the ester by-product.

EXAMPLE 1

About 6 parts of a dimethylpolysiloxane which has an Si-bonded hydroxyl group in each of the terminal units and which has a viscosity of 1,000 cP at 25°C. are mixed with 2 parts of quartz powder, 1 part calcium carbonate, 0.009 part water and 0.045 part of a copolymer which contains at least 3 Si-bonded hydroxyl groups per molecule and consists of equal parts of $CH_3SiO_{3/2}$- and $(CH_3)_2SiO$- units and a viscosity of 25 cP at 25°C. To the mixture thus obtained is added about 3 percent by weight of the condensation catalyst prepared in accordance with the procedure described in (A) above. A plastic substance which has rebounding elasticity is formed within 3 days at room temperature. After 1 week, the penetration factor (measured according to DIN 51,804, page 2, with the ¼ cone) of the plastic substance is 53 and after 3 months the value is still the same. Even after a test sample of this substance has been boiled in water for 8 days, it is still plastic and has a high degree of elasticity.

EXAMPLE 2

About 6 parts of a dimethylpolysiloxane which has an Si-bonded hydroxyl group in each of its terminal units and which has a viscosity of 900 cP at 25°C. are mixed with 2 parts of diatomaceous earth, 1 part quartz powder, 0.007 part water and 0.225 part of a mixture which has previously been heated for 30 minutes at 100°C. and which consists of 8 parts of a dimethylpolysiloxane which has an Si-bonded hydroxyl group in each of its terminal units and which has a viscosity of 30 cP at 25°C. and 1 part of a copolymer which has a total of at least 3 Si-bonded hydroxyl and ethoxy groups per molecule and which consists of monomethylsiloxane-, $SiO_{4/2}$- and dimethylsiloxane units which contain an average of 0.9 to 1.1 methyl groups per Si-atom and which has a viscosity of 800,000 cP at 25°C. are mixed together. The viscosity of the resulting composition is considerably below 100,000 cP at 25°C. due to the relatively low content of high viscosity organopolysiloxanes in the composition.

About 5 percent by weight of the condensation catalyst prepared in accordance with the procedure described in (A) above, is added to the mixture. Within 3 days a plastic substance having excellent rebounding properties is formed at room temperature. After 2 weeks, the penetration factor (measured by the method described in Example 1) is 56, and after 3 months, the value is still the same.

Even after a test sample of this substance has been left in boiling water for 8 days, it is still plastic and still has excellent rebounding properties.

EXAMPLE 3

About 6 parts of a copolymer which consists of 99.75 parts of dimethylsiloxane and 0.25 part of monomethylsiloxane units and having a viscosity of 900 cP at 25°C. and containing at least 3 Si-bonded hydroxyl groups per molecule, are mixed with 2 parts of calcinated aluminum silicate, 1 part diatomaceous earth and 0.009 part of water.

About 4 percent by weight of the condensation catalyst prepared in accordance with the procedure described in (A) above is added to the mixture. Within 3 days a plastic substance which has excellent rebounding properties is formed at room temperature. After 1 week, the penetration factor (measured by the method described in Example 1) of this mass is 48, after 3 months it remains unchanged.

A test sample of this substance is still plastic and still has excellent rebounding properties after it has been left in boiling water for 8 days.

EXAMPLE 4

About 6 parts of a dimethylpolysiloxane having an Si-bonded hydroxyl group in each of its terminal units and a viscosity of 1,000 cP at 25°C. are mixed with 2 parts of a calcium carbonate powder coated with calcium stearate, 1 part untreated calcium carbonate powder, 0.009 part water and 0.18 part of a copolymer which has a total of at least 3 Si-bonded hydroxyl and ethoxy groups per molecule. The copolymer consists of 10 parts dimethylsiloxane and 1 part monomethylsiloxane units and has a viscosity of 200 cP at 25°C.

To the mixture obtained is added 7 percent by weight of the condensation catalyst prepared in accordance with the procedure described in (B) above. Within 3 days a plastic substance which has excellent rebounding properties was formed at room temperature. After 2 weeks, the penetration factor (measured by the method described in Example 1)of this material is 61 and remains unaltered after 3 months.

A test sample of this substance remains plastic and still exhibits excellent recoil elasticity even after it has been left in boiling water for 8 days.

For comparison purposes a commercial "bouncing putty" made of borosiloxane is immersed in boiling water for just 1 hour. A stratum which has a much lower viscosity than the inner portion of the putty forms on the surface of the putty as a result of the hydrolysis of the

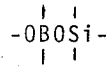

groups. This finally results in the total loss of the putty's rebounding properties.

EXAMPLE 5

About 6 parts of a dimethylpolysiloxane which has an Si-bonded hydroxyl group in each of its terminal units and has a viscosity of 1,000 cP at 25°C., are mixed with 2 parts of quartz powder, 0.008 part water and 0.016 part methyltriethyloxysilane. About 5% by weight of the condensation catalyst prepared in accordance with the procedure described in (A) above is added to the mixture thus obtained. Within 3 days, at room temperature, a plastic substance with rebounding properties is formed. After 2 weeks, the penetration factor of this substance (measured by the method described in Example 1) is 48 and remains unchanged after 3 months.

When the above examples are repeated using condensation catalysts which are obtained from the reaction of other dialkyldialkoxysilanes and tin carboxylates, substantially the same results are achieved.

Although specific examples of this invention have been described, it is not intended to limit the invention solely thereto but to include all the variations and modifications falling within the spirit and scope of the appended claims.

What is claimed is:

1. A composition having a high degree of elasticity under suddenly applied stress comprising an organopolysiloxane containing condensible groups and having diorganosiloxane units and a small amount of siloxane units or silanes whose functionality is greater than the functionality of the diorganopolysiloxane units, said silanes are represented by the formula $R_aSiX'_{4-a}$ and said siloxane units are selected from units of the formula $RSiO_{3/2}$ and $SiO_{4/2}$ units in which these siloxane units can be substituted by units of the formula

R is selected from the class consisting of monovalent hydrocarbon radicals, halogenated monovalent hydrocarbon radicals and cyanoalkyl radicals, R' is a divalent hydrocarbon radical, X' is a hydrolyzable group and a is 0 or 1, and a condensation catalyst in an amount of from 0.1 to 15 percent by weight based on the weight of the organopolysiloxane, said catalyst is obtained from the reaction of a dialkyldialkoxysilane and a tin carboxylate at a temperature of from 50° to 200°C.

2. The composition of claim 1 wherein the amount of condensation catalyst is from about 0.5 to about 10 percent based on the weight of the organopolysiloxane.

3. The composition of claim 1 wherein the condensation catalyst is obtained from the reaction of from 2 gram-atoms of tin per mole of dialkyldialkoxysilane to 1 gram-atom of tin per 2 moles of dialkyldialkoxysilane.

4. The composition of claim 1 wherein the condensation catalyst is prepared by reacting a dialkyldialkoxysilane with a tin carboxylate and thereafter removing the carboxylic acid ester by-product.

5. The composition of claim 3 wherein the condensation catalyst is obtained from the reaction of dibutyltindiacetate and dimethyldiethoxysilane.

6. A method for preparing a composition having a high degree of elasticity under suddenly applied stress which comprises mixing a condensation catalyst obtained from the reaction of a dialkyldialkoxysilane and a tin carboxylate at a temperature of from 50° to 200°C. with an organopolysiloxane containing condensible groups and having diorganosiloxane units and a small amount of siloxane units or silanes whose functionality is greater than the functionality of the diorganopolysiloxane units, said silanes are represented by the formula $R_aSiX'_{4-a}$ and said siloxane units are selected from units of the formula $RSiO_{3/2}$ and $SiO_{4/2}$ in which these siloxane units can be substituted by units of the formula

R is selected from the class consisting of monovalent hydrocarbon radicals, halogenated monovalent hydrocarbon radicals and cyanoalkyl radicals, X' is a hydrolyzable group and a is 0 or 1, and said catalyst is present in the composition in an amount of from 0.1 to 15 percent by weight based on the weight of the organopolysiloxane.

7. The method of claim 6 wherein the composition is prepared in the absence of moisture and thereafter exposed to atmospheric moisture to cure the same.

8. The method of claim 6 wherein the condensation catalyst is obtained from the reaction of from 2 gram-atoms of tin per mole of dialkyldialkoxysilane to 1 gram-atom of tin per 2 moles of dialkyldialkoxysilane.

9. The composition of claim 1 wherein said composition contains at least one $RSiO_{3/2}$ or $RSiX_3'$ unit for each 100 to 1000 diorganopolysiloxane units or at least one $SiO_{4/2}$ unit for each 200 to 2,000 diorganosiloxane units.

10. In the composition of claim 9 when said composition contains siloxane units of the formula $R_3SiO_{1/2}$, then said composition contains an excess of at least one $RSiO_{3/2}$ unit or $RSiX_3'$ unit for each $R_3SiO_{1/2}$ unit per 100 to 1,000 diorganopolysiloxane units.

11. In the composition of claim 9 when said composition contains siloxane units of the formula $R_3SiO_{1/2}$, then said composition contains an excess of at least one $SiO_{4/2}$ unit for each two $R_3SiO_{1/2}$ units per 200 to 2,000 diorganopolysiloxane units.

* * * * *